United States Patent [19]

Elmaleh

[11] Patent Number: 4,719,020

[45] Date of Patent: Jan. 12, 1988

[54] PROCESS FOR CONCENTRATING A SUSPENSION OF MICROSCOPIC PARTICLES

[75] Inventor: Samuel Elmaleh, Castelnau le Lez, France

[73] Assignee: Mornex Limited, Londres, France

[21] Appl. No.: 675,200

[22] Filed: Nov. 27, 1984

[30] Foreign Application Priority Data

Nov. 30, 1983 [FR] France .............................. 83 19150

[51] Int. Cl.⁴ .............................................. B01D 37/00
[52] U.S. Cl. .................................... 210/807; 210/702; 210/795; 210/796
[58] Field of Search ........................ 210/791–798, 210/661, 807, 275, 276, 290, 702, 801

[56] References Cited

U.S. PATENT DOCUMENTS

| | | | |
|---|---|---|---|
| 3,412,863 | 11/1968 | Stuart | 210/793 |
| 3,471,025 | 10/1969 | Dobson | 210/290 |
| 4,157,959 | 6/1979 | Wen et al. | 210/807 |
| 4,412,003 | 10/1983 | Evans | 210/275 |
| 4,446,027 | 5/1984 | Simmers | 210/795 |
| 4,547,286 | 10/1985 | Hsiung | 210/792 |
| 4,582,609 | 4/1986 | Hunter, III et al. | 210/807 |

FOREIGN PATENT DOCUMENTS

| | | | |
|---|---|---|---|
| 0085629 | 8/1983 | European Pat. Off. | 210/661 |
| 747511 | 7/1980 | U.S.S.R. | 210/661 |

*Primary Examiner*—Benoît Castel
*Attorney, Agent, or Firm*—Lackenbach Siegel Marzullo & Aronson

[57] ABSTRACT

According to the invention, the enclosure (1) contains a granular material (4) having a specific mass less, or respectively greater than that of the liquid to be treated. When the liquid is admitted through an upper inlet line (2), a granular bed is formed at the bottom of the enclosure (1) or at the upper part thereof and the colloidal particles form aggregates there. When the supply of liquid to be treated is interrupted, the granular material rises to the upper, respectively lower, part of the enclosure (1) and releases the aggregates formed, which can be recovered.

13 Claims, 7 Drawing Figures

PROCESS FOR CONCENTRATING A SUSPENSION OF MICROSCOPIC PARTICLES

FIELD OF THE INVENTION

The present invention relates to a process for concentrating a suspension of microscopic particles in a liquid. It also relates to the application of this process to the collection of living particles in suspension in soft, brackish or salt waters in particular microalgae forming the phytoplankton and microscopic animals forming the zooplankton. The invention also relates to the application of the process to the purification of waste water.

BACKGROUND OF THE INVENTION

In his French patent application No. 82 01589 filed on the Feb. 1, 1982, the applicant referred to the considerable economic interest in collecting microalgae or other living micro organisms. The cost of the usual processes for concentrating the liquids which contain them and for recovering these particles from the concentrations thus formed is unfortunately very high. Furthermore, the addition of chemical reagents for flocculating the desired products risks causing a deterioration of the qualities making these products interesting.

To overcome these drawbacks, the applicant in the above mentioned patent application has proposed an original process for flocculating particles in suspension in a liquid, which does not require chemical reagents and which can be used at high yield, without involving costly operations or apparatus.

The inventor there in fact discovered that a suspension of colloidal particles passing through a granular medium causes a more or less irreversible flocculation of the particles, affecting a variable fraction of the flow treated depending on the nature of the particles. This phenomenon occurs in particular in a way which may be readily observed with microalgae suspensions or else with effluents from biological waste water purifying units (tertiary filtration).

In the above mentioned patent, a first liquid comprising microscopic particles in suspension is caused to pass through a granular medium until said granular medium is partially or completely clogged by said microscopic particles, said granular medium is at least partially unchoked by causing a second liquid to pass therethrough flowing at a higher speed than the first one, and, downstream of said bed in the direction of passage of said liquids, flocculated aggregates of said microscopic particles and a liquid effluent are recovered, partially or totally free from said particles.

The second liquid may be identical to the first liquid and contain particles in suspension. The first and second liquids pass advantageously through the granular medium from bottom to top and this granular medium may remain in a fixed bed or undergo an expansion of about 30% in volume at most during implementation of the process.

The mechanism of the above mentioned process may therefore be summed up in the following way:

from a certain choking up rate of the granular medium, the microscopic particles self-flocculate without the help of any chemical agent, within this granular medium;

during the unchoking phase, the aggregates thus formed are carried along by the liquid and freed from the granular medium on the surface of which they decant on condition, of course, that the upward speed of the liquid is less than the speed at which these aggregates are carried away.

In continuous operation, a slight expansion of the granular medium is maintained in a way such that it presents sufficient resistance to the passage of the particles so that they flocculate and such that, simultaneously, this medium is sufficiently permeable for the aggregates thus formed to be able to pass therethrough and be released.

To this end, in practice, as is described in the prior patent application, the partially purified liquid effluent is recycled, at least partially, to the supply side of the granular medium.

OBJECTS OF THE INVENTION

The aim of the present invention is to overcome this drawback and to provide a process based on the same phenomenon as the prior process but whose yield is considerably greater than that of the preceding one, without having to recycle a fraction of the liquid effluent.

The present invention provides firstly a process for concentrating microscopic particles in suspension in a liquid, in which the liquid is caused to pass from top to bottom through an container comprising a bottom, at least one liquid inlet disposed at its upper part and at least one liquid outlet disposed at its lower part, said container containing a granular medium having a specific mass less than that of said liquid, the speed of said liquid in said enclosure being such that it carries with it towards said bottom, by itself or in combination with an auxiliary means such as a piston, the grains of said material so that they form a granular bed in which said microscopic particles form aggregates, in that the supply of said liquid to said container is interrupted when said granular bed is choked up, in that said grains of material are allowed to rise to the top of said container under the effect of Archimedes thrust (bouyancy), while communicating a complementary thrust thereto if required, to free said aggregates, in that said aggregates are left to decant and in that they are recovered at the lower part of said container;

The invention also provides a process for concentrating microscopic particles in suspension in a liquid, in which the liquid is caused to pass from bottom to top through an container closed at its upper part and comprising a bottom, at least one liquid inlet disposed at its lower part and at least one liquid output disposed at its upper part, said container containing a granular medium having a specific mass greater than that of said liquid, the speed of said liquid in said enclosure being such that it carries the grains of said material with it towards the upper part so that they there form a granular bed in which said microscopic particles form aggregates, in that the supply of said liquid to said enclosure is interrupted when said granular bed is choked up, in that said grains of material are left to settle by gravity effect to the bottom of said container, while communicating thereto a complementary thrust if required, to free said aggregates, in that said aggregates are left to decant and in that they are recovered at the lower part of said enclosure.

The invention also provides a device for implementing the above defined process, this device an container closed at its upper part and having a bottom, at least one liquid inlet disposed at its upper, respectively lower, part and at least one liquid outlet disposed at its lower, respectively upper, part, said container containing a granular medium having a specific mass less, or greater, than that of said liquid.

Clearly the apparent volume of said granular medium must be considerably less than the internal volume of said enclosure.

This enclosure may possibly comprise a lower cylindrical part in which a piston means may slide, disposed above the granular medium for communicating thereto an auxiliary thrust, both towards the bottom of the container and towards the upper part. In this case, the liquid intake into said enclosure will take place through said piston which will thus act as liquid distributor. During the choking up or clogging phase of the granular bed, this latter will be held against the bottom by said piston, the intake of liquid to be treated being provided directly by the distributor piston, whereas for declogging it is sufficient to raise said piston, while simultaneously sucking treated liquid from the liquid outlet.

The invention also relates to the application of the above mentioned process to the collection of living particles, particularly microalgae, in suspension in the liquid. The absence of any addition of chemical products or of any complex physical treatment in the process of the invention allows in fact the living matter to be recovered without deterioration of their physico-chemical properties.

Finally, the invention relates to the application of the above mentioned process to the treatment of waste water, possibly after pre-treatment thereof. In this application, the process of the invention is much less costly than prior treatments, because of the absence of any flocculation reagent.

In a particularly advantageous embodiment of the process of the invention, the upper part of the enclosure where the granular material collects, when the liquid supply is interrupted, will have a cross section substantially greater than that of the lower part of said enclosure. In fact, in this case, the grains of material may rise much more readily under Archimedes thrust (buoyancy), while moving away from each other so as to readily free the aggregates formed. The enclosure may for example have the form of a vertical cylinder opening out in the form of a truncated cone in its upper part or having a conical part at its base.

Naturally, any other form of enclosure may be contemplated without departing from the scope of the invention and the enclosure may be slanted instead of being upright.

The supply of liquid to be treated is interrupted when the granular bed formed at the base of the enclosure is clogged, that is to say when the concentration in colloidal particles of the effluent is substantially equal to that of the supply, or when the pressure drop through the granular bed reaches a predetermined value or else when, empirically, it is thought that the mass of aggregates formed in the granular bed has reached a sufficient value.

As mentioned above, Archimedes thrust carries the particles upwards from the granular bed when the liquid supply is stopped. If Archimedes thrust is insufficient, a complementary thrust may be exerted for example by supplying the container with liquid, in a rising stream from its base, or else by injecting a gas at its lower part.

BRIEF DESCRIPTION OF THE DRAWINGS

The accompanying drawings illustrate diagrammatically different embodiments of the invention. In these drawings.

DESCRIPTION OF PREFERRED EMBODIMENT OF THE INVENTION

Figure 1:
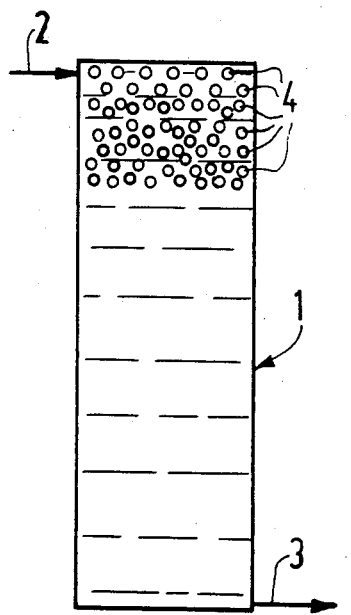
FIGS. 1, 2 and 3 illustrate three successive phases of the process of the invention, put into practice in a cylindrical container.

FIG. 1 shows a cylindrical enclosure 1, with vertical axes, fed at its upper part with liquid to be treated through a line 2, whereas the treated liquid is discharged at its lower part through a line 3. This enclosure contains solid particles 4 of a material of a density less than that of the liquid to be treated and which therefore float at the upper part of this liquid when it is at rest. (FIG. 1).

Figure 2:
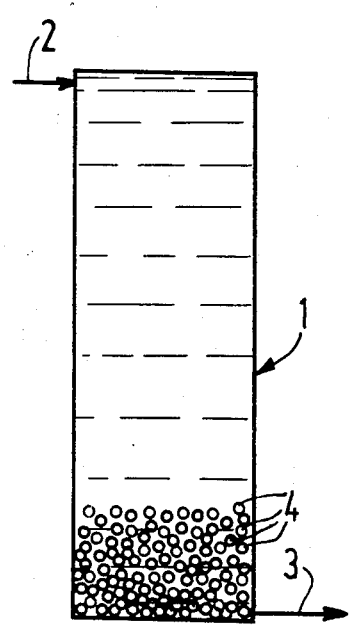

When the liquid to be treated is fed into enclosure 1 at a sufficient rate, the particles 4 are carried by the liquid to the bottom of the enclosure, on which they are deposited while forming a granular bed through which the liquid passes before being discharged through line 3 (FIG. 2).

If the grain size of particles 4 is such that the granular bed acts as a filter with respect to the liquid, the colloidal particles which this liquid contains flocculate in the bed and form aggregates which progressively clog up the granular bed.

Figure 3:
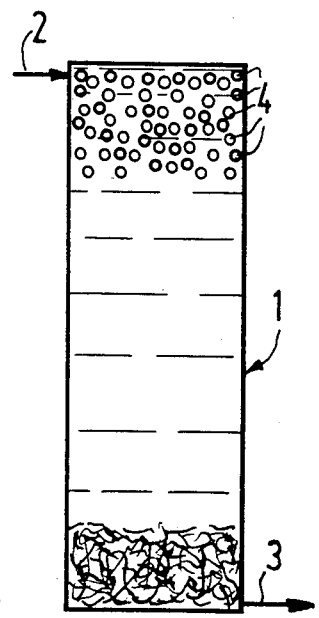

When the clogging up has reached a predetermined degree, it is sufficient to stop the liquid supply so that, under the effect of Archimedes thrust, the particles 4 rise to the uppper part of enclosure 1 (FIG. 3). The bed, thus broken up, releases the flocculates which were formed therein and they are deposited on the bottom of enclosure 1 from where they can be recovered.

In the case of microalgae, the granular medium will preferably have a grain size between 2 and 5 mm and a density between 0.9 and 0.95 g/cm$^3$.

Still in the case of microalage, the velocity of the liquid to be treated through said enclosure will be between 25 and a 100 cm per hour, depending on the nature of the granular material and that of the particles in suspension.

In the case of microalgae, the mass of aggregates retained varies little as a function of the grain size of particles 4 and therefore it is possible to use coarse materials, whose largest dimension is between 2 and 5 mm, which naturally creates an economic advantage.

The efficiency of retention of the microalgae is nevertheless greatly dependent on the velocity of the liquid in the enclosure. A speed of 1 m/h forms a maximum, if it is desired to recover at least 50% of the microalgae in suspension, whereas with a speed of 0.5 m/h more than 70% of the microalgae can be recovered. Naturally, the efficiency of the process depends on the initial concentration of colloidal particles in the liquid;

The maximum pressure drops resulting from clogging up of the granular bed are small, for example in the order of 40 mm of water, per meter of granular bed.

In order to promote movement of the particles from the granular bed, when they rise under the effect of Archimedes thrust, and thus to readily release the aggregates formed, it is preferable, as was mentioned above, for the upper part of the enclosure to have a cross section greater than its lower part.

Figure 4:
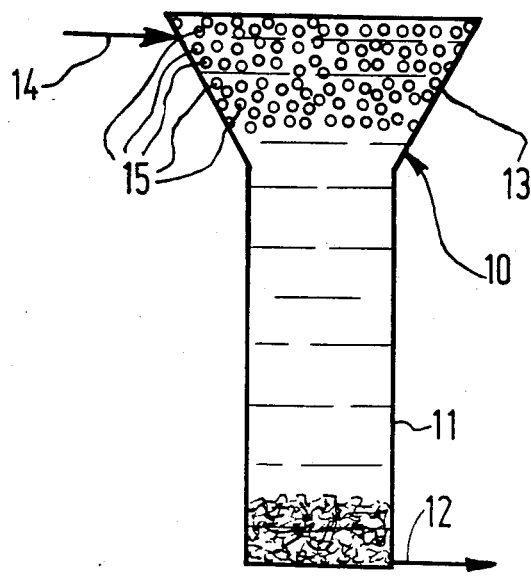
FIGS. 4 and 5 are diagrammatically views illustrating, respectively, a cylindrical container whose upper part widens outwardly in the form of a truncated cone and whose lower part has a conical shape.

Thus for example in the case of FIG. 4 enclosure 10 comprises a cylindrical body 11, at the lower part of which is disposed the line 12 for discharging treated liquid and an upper part 13, in the form of a truncated cone widening outwardly, connected to body 11 and supplied with liquid to be treated through a line 14. Preferably, the volume of the truncated cone shaped part 13 will be greater by at least 50% than the apparent volume of the granular bed formed by particles 15.

Figure 5:
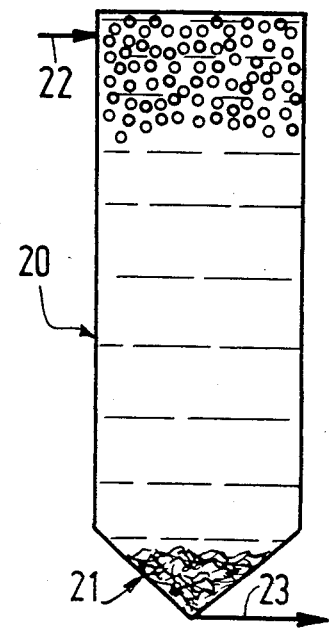

In another embodiment, in the case of FIG. 5, the cylindrical body 20 of the enclosure is connected at its base to a bottom part 21 conical in shape. A line 22 supplies the upper part of body 20 with liquid to be treated whereas a line 23 removes the treated liquid outwardly from part 21.

Whatever the form of the enclosure, the flocculates which decant at its lower part may be removed through the treated liquid discharge line or through another duct at the base of the enclosure.

Similarly, as mentioned above, a duct may be provided at the base of the enclosure for injecting liquid or gas (or the treated liquid discharge line may be used for this purpose), to exert a complementary thrust on the particles of the granular bed, at the end of treatment, in the case where the Archimedes thrust is insufficient for causing these particles to rise and free the flocculates.

It may happen, however, that, considering the low speed at which the liquid to be treated passes through the enclosure, the liquid flow is insufficient at the beginning of the clogging up process to carry with it the particles of filter-forming solid to the bottom of the enclosure. In this case, it will be necessary to use an auxiliary mechanical means as a piston for pushing the particles to the bottom and holding them there in position, this means being raised to the top of the enclosure during declogging of the granular bed and then exerting on the particles a driving force which is added to Archimedes thrust.

Figure 6:
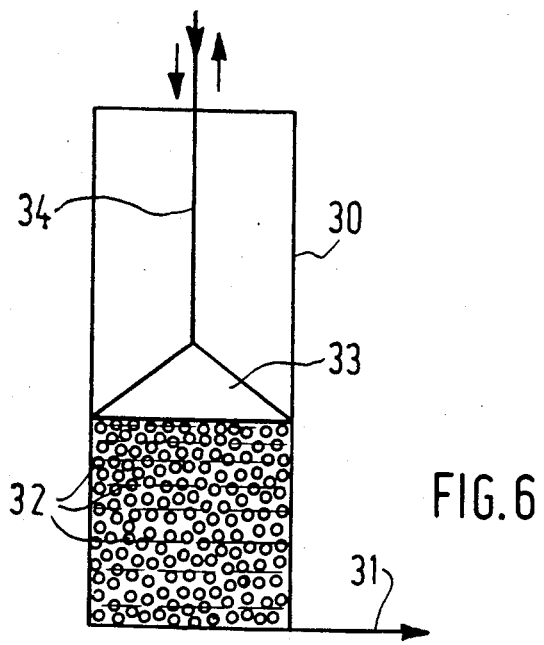
FIG. 6 is a diagrammatic view illustrating FIG. 2, for the case where the cylindrical container is equipped with a liquid distributing piston, which holds the granular bed applied against the bottom of the container during the clogging up phase.
Figure 7:
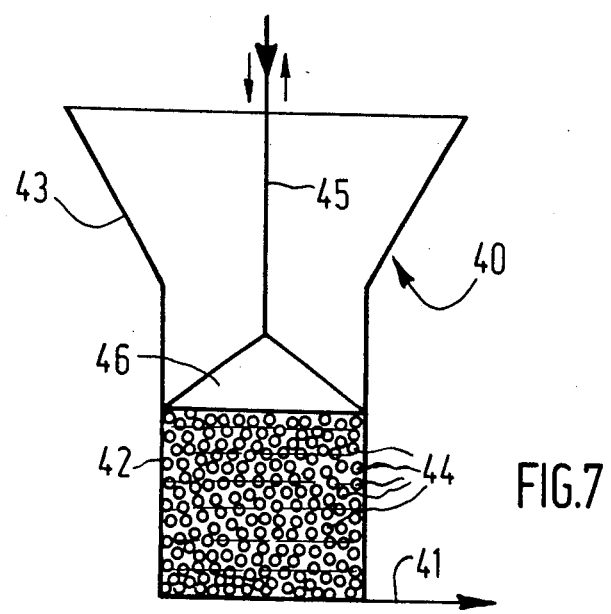
FIG. 7 is a diagrammatic view illustrating FIG. 6 for the case of an container of the type shown in FIG. 4.

A device of this type is shown in FIGS. 6 and 7.

In FIG. 6, there is shown a vertical cylindrical enclosure 30, having at its base a liquid discharge line 31 and containing particles 32 of a solid having a density less than that of the liquid to be treated. In this enclosure 30 is mounted for sliding, under the effect of a drive means not shown, a piston 33 of a section equal to the internal section of the cylinder with a hollow rod 34 through which arrives the liquid to be treated which is pushed to the bottom of the enclosure through orifices (not shown) formed in the face of the piston 33 pointing towards the bottom. At the beginning of the treatment of the liquid charged with colloidal suspension, piston 33 is lowered to the bottom of enclosure 30 and applies pressure against the particles 32 which, during the whole treatment time are held between the piston and the bottom to form there a granular bed. The supply of liquid to be treated is provided through the orifices in the lower face of piston 33 and the liquid penetrates directly into the granular bed.

When this bed is clogged up, the supply of liquid to be treated is interrupted and piston 33 is raised to the top of the enclosure. During its movement, it takes with it particles 32 and sucks liquid through ducts 31, which promotes unclogging of the granular bed.

FIG. 7 shows a similar device in the case of an enclosure 40 having at its base a discharge duct 41 and comprising a lower cylindrical part 42 and an upper part 43 in the form of an upwardly widening truncated cone. Enclosure 40 contains particles 44 of a solid having a density less than that of the liquid to be treated As above, this liquid flows through the hollow rod 45 of a piston 46 having a cross section equal to that of the cylindrical part 42 of the enclosure and is discharged through orifices (not shown) in the face of this piston turned towards the bottom of the enclosure. Piston 46 is able to move in both directions between top and bottom of the enclosure 40 by drive means not shown.

At the beginning of the treatment, when piston 46 is at the top of the widened part 43 of the enclosure, it is sufficient to wait for the particles 44 to penetrate into the cylindrical part 42 under the thrust of the liquid to be treated alone for then lowering piston 46 to the bottom of this enclosure. The treatment then continues in the way described in connection with FIG. 6.

Of course, any other type of piston system could be used without departing from the spirit of the invention.

Still within the scope of the invention, a granular bed could be used formed from a material having a density greater than that of a liquid to be treated and the column could be supplied at its base at a speed such that the granular medium is carried up to and applied against the top of said column where the treated liquid is discharged. During the declogging phase, with the supply stopped, the granular bed is deposited by gravity and releases the particles which are clustered there.

The device of the invention may serve for concentrating any type of suspension, even in the absence of the flocculation phenomenon, the granular bed then acting as a simple filter. It is however particularly appropriate for suspensions of particles lending themselves to flocculation and it is thus that, in the case of microalgae, using an enclosure of a volume of 25 liters, containing an apparent volume of 4 liters of polyethylene particles, of a grain size between 2 and 3 mm, it is possible with a flow rate of 40 l/h after five days of treatment to pass from an initial concentration of 200 mg/l to a final concentration of about 100 g/l, namely a concentration rate of about 500.

Results which are just as advantageous are obtained in the application of the process to the purification of waste water in the absence of any flocculant or other chemical reagent.

The invention provides then a generating process and a hydraulic gradient causing the flocculation of colloidal suspensions. For waste water and microalgae suspensions, it provides self flocculation without addition of reagents. In some cases however it may be advantageous to add chemical or biological reagents which may help the aggregation phenomenon and the formation of the flocculus.

It is within the scope of the present invention to apply the process and apparatus described above to the treatment of waste waters or other liquids containing microscopic particles in suspension to which reagents, known to those skilled in the art, have been added.

I claim:

1. A process for concentrating microscopic particles suspended in a liquid comprising:
   (a) passing the liquid suspension from the top to the bottom of a closed container comprising:
      (i) a bottom,
      (ii) at least one liquid inlet at the top thereof,
      (iii) at least one liquid outlet at the bottom thereof,
      (iv) granular medium with a density less than that of the liquid;
   (b) imparting a velocity to said liquid through said container sufficient to press said microscopic particles and said granular medium into a mixed bed at said bottom;
   (c) continuing passage of said liquid suspension through said bed until the bed becomes clogged with flocculated aggregates of the microscopic particles;
   (d) interrupting passage of the liquid, whereby the granular medium with a density less than that of the liquid rises in the container, and the flocculated aggregates remain near the bottom of the container; and
   (e) recovering the flocculated aggregates at the outlet at the bottom of the container.

2. A process as in claim 1, wherein the velocity of liquid in step (b) is augmented with mechanical pressure means.

3. The process of claim 2, wherein the mechanical pressure means is a piston.

4. The process of claim 1, wherein the cross-section of the upper part of the container is larger than that of the lower part of the container.

5. The process of claim 4, wherein the container comprises a cylinder extended upwardly by an outwardly widening truncated cone.

6. The process of claim 1, wherein the lower part of the container is conical.

7. The process of claim 1, wherein the granular medium has a grain size from about 2 to about 5 mm, a density from about 0.90 to about 0.95 g/cm$^3$, and the velocity of the liquid is from about 25 to 100 cm/h.

8. The process of claim 1, wherein the liquid being treated is a waste water.

9. The process of claim 1, wherein the liquid being treated is free of added flocculants.

10. A process for concentrating microscopic particles suspended in a liquid comprising:
    (a) passing the liquid suspension from the bottom to the top of a closed container comprising:
       (i) a bottom,
       (ii) at least one liquid inlet at the bottom thereof,
       (iii) at least one liquid outlet at the top thereof,
       (iv) granular medium with a density greater than that of the liquid;
    (b) imparting a velocity to said liquid through said container sufficient to carry the medium and the particles pressed together to the top of the container as a mixed bed;
    (c) continuing passage of said liquid suspension through said bed until the bed becomes clogged with flocculated aggregates of the microscopic particles;
    (d) interrupting passage of the liquid, whereby the heavier granular medium and flocculated aggregates sink separately to the bottom of the container; and
    (e) recovering the flocculated aggregates at the outlet at the bottom of the container.

11. The process as in claim 10, wherein the velocity of liquid in step (b) is augmented with mechanical pressure means.

12. The process as in claim 11, wherein the mechanical pressure means is a piston.

13. The process of claim 10, wherein the granular medium has a grain size from about 2 to about 5 mm, a density greater than 1.0 g/cm$^3$, and the velocity of the liquid is from about 20 to about 100 cm/h.

* * * * *